United States Patent [19]

Audet

[11] Patent Number: 4,826,387
[45] Date of Patent: May 2, 1989

[54] VEHICLE ROOF RACK

[76] Inventor: Marcel Audet, 1617 - 6th Avenue N., Regina, Saskatchewan, Canada, S4R 0M6

[21] Appl. No.: 130,374

[22] Filed: Dec. 8, 1987

[30] Foreign Application Priority Data

Dec. 18, 1986 [CA] Canada .................................. 525804

[51] Int. Cl.⁴ ............................................... B60R 9/04
[52] U.S. Cl. .................................. 414/462; 224/310; 224/315; 224/321
[58] Field of Search ............... 224/309, 310, 315, 321; 414/462

[56] References Cited

U.S. PATENT DOCUMENTS

| | | | |
|---|---|---|---|
| 2,746,628 | 5/1956 | Neyra | 414/462 |
| 3,013,681 | 12/1961 | Garnett | 414/462 |
| 3,696,953 | 10/1972 | Kim | 414/462 |
| 3,809,425 | 5/1974 | Blaschke | 296/22 |
| 4,339,223 | 7/1982 | Golze | 414/462 |
| 4,350,471 | 9/1982 | Lehmann | 414/463 |

Primary Examiner—Frank E. Werner
Assistant Examiner—Janice Krizek
Attorney, Agent, or Firm—Irell & Manella

[57] ABSTRACT

Heavy materials such as ladders, pipes and the like are often carried on a roof rack secured to the roof of service trucks, vans and the like and of course are difficult to place on the rack and remove therefrom. The present device includes a carrier which can be extended and retracted relative to the rack and is hinged so that it drops down adjacent the sides of the truck when extended, to facilitate loading and unloading of the material carried by the rack. When hinged upwardly to approximately the horizontal position, it may be pushed towards the longitudinal center of the roof so that it telescopes inwardly thus supporting the material upon the rack. Automatic latches are included to detachably lock the carrier in the retracted position and snubbers are provided to space the carrier from the side walls of the van or truck when in the extended, substantially vertical position.

20 Claims, 2 Drawing Sheets

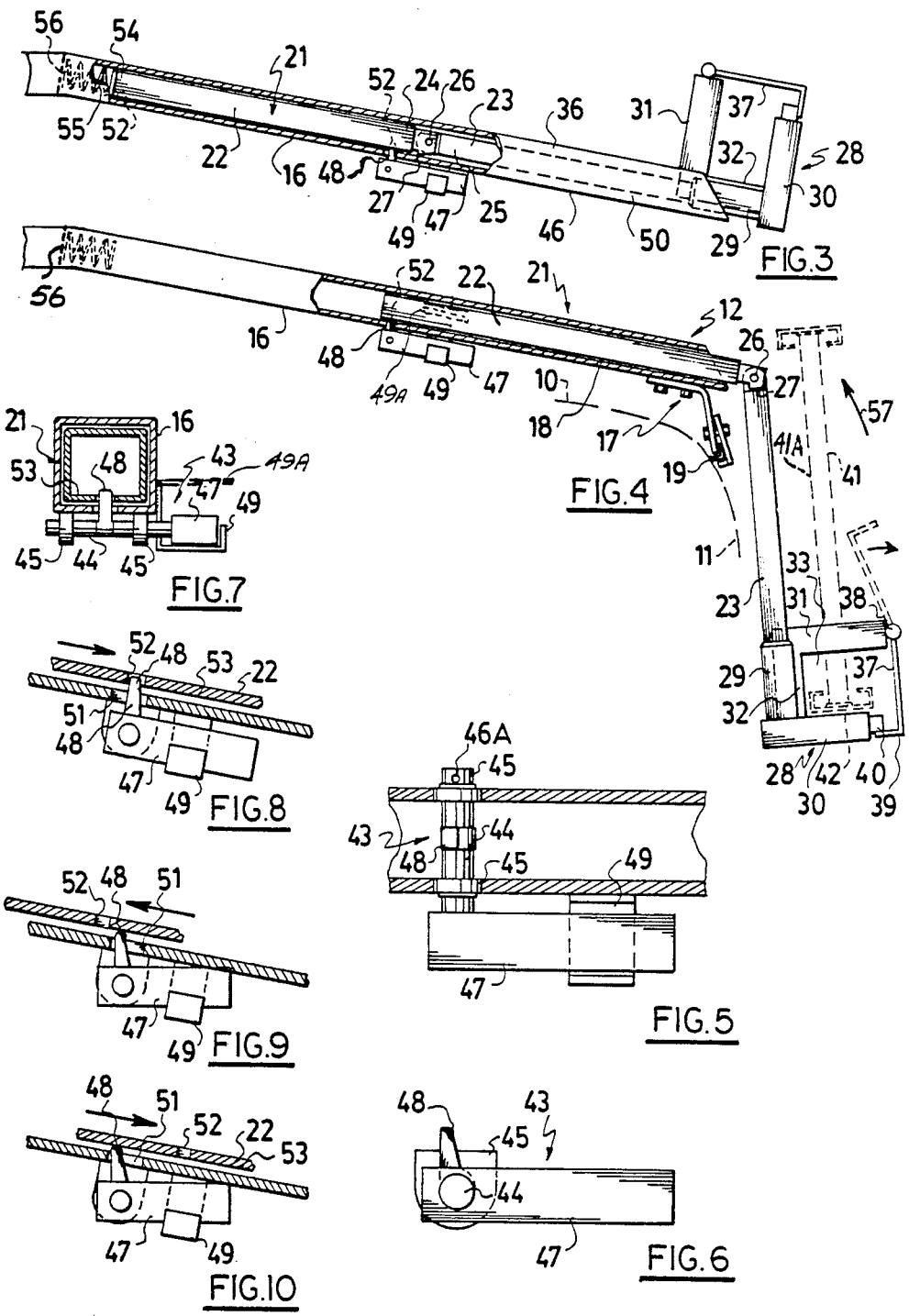

VEHICLE ROOF RACK

BACKGROUND OF THE INVENTION

This invention relates to new and useful improvements in roof racks, particularly roof racks adapted to carry relatively heavy material on the roofs of vans, covered trucks and the like.

Such service or maintenance vans or trucks are often required to carry relatively heavy materials such as extension ladders, step ladders, lengths of metal or plastic tubing, rods, bars or the like, some of which are relatively heavy and are extremely awkward to lift to and from a conventional roof rack.

PRIOR ART

Patents known to applicant include the following:

1. U.S. Pat. No. 2,746,628 -C. S. Neyra issued May 22, 1956. This patent shows a roller mounted carriage with a rack depending therefrom and running upon a pair of spaced and parallel roof rack members.

2. U.S. Pat. No. 3,013,681 -E. V. Garnett issued Dec. 19, 1961. This invention shows a pivotal rack assembly including means for locking the rack in the overhead storage position and resilient means for counter-balancing the weight of the article on the rack.

3. U.S. Pat. No. 3,696,953 -S. P. Kim issued Oct. 10, 1972. This shows a boat loader situated at the rear of a van and including table and winch systems for raising and lower same.

4. U.S. Pat. No. 3,809,425 -A. B. Blaschke issued May 7, 1974. This invention teaches a kitchen accessory for cars including a built-in rack and table.

5. U.S. Pat. No. 4,350,471 -J. C. Lehman issued Sept. 21, 1982. This shows a hinged roof rack for the side or rear of a vehicle for a spare tire or the like with the extension folding upwardly and over onto the roof rack portion.

6. U.S. Pat. No. 4,339,223 -R. R. Golze issued July 13, 1982. This teaches a car top carrier which can be moved both horizontally and vertically and includes pneumatic or hydraulic cylinders together with an electrical interlock between the ignition and the car top carrier to prevent the load from sliding off the roof due to centrifical force.

The present invention overcomes these disadvantages by providing a roof rack assembly which includes one and preferably two carrier components one upon each side of the vehicle which can be extended from the rack and allowed to drop downwardly by gravity to lie alongside the upper portion of the sides of the vehicle for loading or unloading. When loaded, these extended portions are hinged upwardly parallel with the portion of the roof rack to which they are attached whereupon they may be telescoped inwardly relative to the roof rack so that the material carried by the carrier lies upon the roof rack.

One aspect of the invention is to provide a roof rack assembly for vehicles such as vans or covered trucks which include a roof panel and side walls extending downwardly from the longitudinal edges of the roof panel, and comprising in combination a substantially rectangular support frame supportable upon the roof panel of a vehicle, means to detachably secure said frame upon the roof panel, a carrier assembly on at least one side of said frame for receiving and supporting material thereon, and means cooperating between said carrier assembly and said frame to move and support said carrier from a substantially horizontal retracted position upon said frame to an extended substantially vertical position adjacent the side wall of the associated vehicle and vice versa.

Another advantage of the invention is that automatic latching means may be provided for the retracted and extended position, the latches maintaining the extendable or telescopic portions in the retracted position and also preventing complete disengagement of the telescopic portions when in the extended position.

Another advantage of the invention is to provide means to selectively retain the material within the rack portion of the assembly.

A still further advantage of the invention is to provide a device of the character herewithin described which is simple in construction, economic in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the invention, in which:

DESCRIPTION OF THE DRAWINGS

FIG. 3 is an end view of the assembly showing the rack in the retracted position.

FIG. 4 is a view similar to FIG. 3 but showing the rack in the extended or loading and unloading position.

FIG. 5 is an enlarged fragmentary top plan view of one of the latching assemblies.

FIG. 6 is a side elevation of FIG. 5.

FIG. 7 is an end view of FIG. 5.

FIG. 8 is a fragmentary enlarged view showing the latch assembly in the rack retaining position.

FIG. 9 is a view similar to FIG. 8 but showing the rack in the releasing position.

FIG. 10 is a view similar to FIGS. 8 and 9 but showing the rack in the extended position.

In the drawings like characters of reference indicate corresponding parts in the different figures.

DETAILED DESCRIPTION

Figure 1:
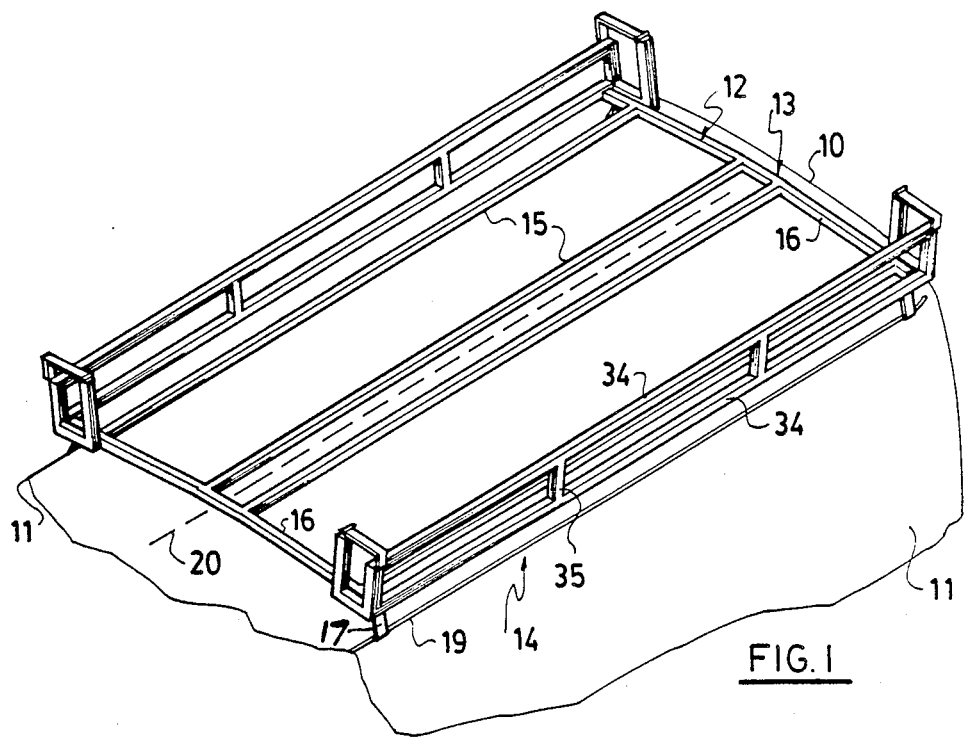
FIG. 1 is an isometric view of the roof rack assembly situated upon the roof of a vehicle shown in fragmentary form.
Figure 2:
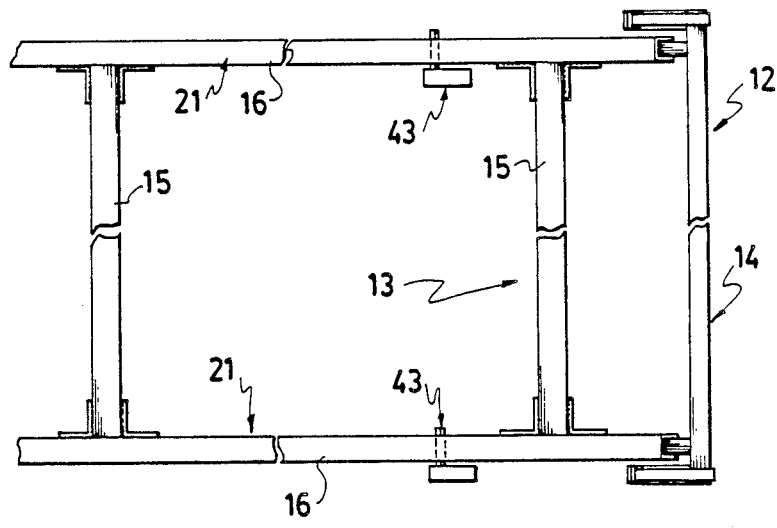
FIG. 2 is a top plan view of the assembly.

Proceeding therefore to describe the invention in detail, reference should first be made to FIGS. 1 and 4 which show the upper roof panel 10 of a van or covered truck together with portions of the side panels 11 extending downwardly from each longitudinal edge of the roof panel, the construction of which is conventional.

The invention collectively designated 12 is a roof rack assembly which includes a main support frame collectively designated 13 and a carrier assembly collectively designated 14 upon each longitudinal edge of the main support frame 13. However, it will be appreciated that only one carrier may be provided if desired but it is preferable that a carrier assembly 14 be provided on each side of the support frame.

The support frame is substantially rectangular when viewed in plan and consists of a plurality of long spaced and parallel longitudinally extending frame members 15 which are preferably formed from hollow, square cross sectioned tubing maintained in the desired relationship by front and rear transversely extending frame members 16 and these transverse frame members are hollow and are also preferably formed from square cross sectioned tubing as clearly shown in FIG. 1.

When installed upon the roof panel 10 of a vehicle, the support frame is maintained spaced above the roof panel by the provision of four support members collectively designated 17, one of which is shown in FIG. 4. This is an adjustable metal bracket secured to the underside 18 of the transverse frame members 16, adjacent each outer end thereof and extending outwardly and downwardly to engage the conventional rain gutter assembly 19 of the vehicle to which the brackets are clamped in a conventional manner thus maintaining the roof rack firmly in position upon the roof panel and spaced thereabove.

Alternatively, rubber suction cups (not illustrated) may be used, once again spacing the frame above the roof panel in a manner similar to conventional roof rack attachment means.

It will also be noted from the drawings, that the support frame angulates outwardly and downwardly from the longitudinal centre line 20 to follow approximately, the curvature of the roof panel 10.

Each carrier assembly 14 includes a pair of spaced apart elongated members collectively designated 21 and best seen in FIG. 3. These members are adapted to slidably engage within the ends of the hollow transverse members 16 and to extend and retract relatively thereto.

Each elongated member includes an inner portion 22 and an outer portion 23 which is pivotally connected to the outer end 24 of the inner portion, by the inner end 25 of the outer portion, pivot pin 26 forming this pivotal connection. The pivot pin 26 is substantially horizontal so that when the carrier is in the outer or extended position shown in FIG. 4, the outer portions move downwardly to a substantially vertical position, by gravity and, conversely, can be lifted up to be in longitudinal alignment with the inner portions 22 so that the entire elongated members can be pushed inwardly to the retracted position within the transverse members 16, as shown in FIG. 3.

Means are provided at the junction between the inner and outer portions 22 and 23, to prevent the outer members from coming into contact with the side panels 11 of the vehicle, said means taking the form of snubbers 27 formed on the pivotal connection between the two portions, which limit the movement of the outer portions towards the vertical when in the extended position.

A material holding jaw collectively designated 28 is secured to the distal end 29 of each of the outer portions 23, said jaw being substantially U-shaped and including an outer jaw member 30, an inner jaw member 31 and a base cross member 32 with the open end 33 facing outwardly when in the extended position shown in FIG. 4 and upwardly when in the retracted telescoped position as shown in FIG. 3.

A pair of longitudinally extending members 34 (FIG. 1) extend between the outer and inner ends respectively of the lower jaw member 30 and may be braced with straps 35 thus forming, together with the jaws 28 a material supporting rack on the ends of the outer members 23 and it will be noticed that these rack portions are spaced outwardly slightly from the ends 29 of the outer portions 23 so that, when retracted as shown in FIG. 3, these racks are above the upper surfaces 36 of the transverse frame members 16. This permits the material being carried by the rack portions to lie on top of the frame members 16 when in the retracted position.

Means are provided to detachably retain the material within the jaws 28 and upon the rack portion, said means taking the form of a closure strap 37 pivoted by one end thereof to a lug 38 on the outer end of the inner jaw member 31 and having a right-angulated distal end portion 39 which, when in the position shown in solid lines in FIG. 4, overlies a further lug 40 extending from the outer end of the outer jaw 30. Both this lug 40 and the angulated end 39 are apertured so that a fastener such as a padlock or the like (not illustrated) can be engaged through the lug and the end 39 to detachably retain the closure strap over the open end 33 of the jaws 28.

In FIG. 4, an extension ladder is shown in phantom and indicated by reference character 41 with the lower side member 42 resting upon the outer jaw members 30 and the rack portions 34 and 35 with the inner jaws 31 passing between the rungs 41A and over the sides 42 of the ladder and being maintained within the jaws by means of the closure strap 37. The ladder rests against the ends of the transverse members 16 when in the extended position in FIG. 4 but slides up over the top of these members when in the retracted position shown in FIG. 3.

Means are provided to detachably retain the rack assemblies in the extended and retracted positions relative to the transverse tubes 16 and in this connection it should be appreciated that the transverse dimensions of the elongated members 21 are somewhat smaller than the internal transverse dimensions of the transverse members 16.

FIGS. 5 through 10 show the latching assembly collectively designated 43 which cooperates with the members 16 and the members 21 to detachably retain them in the two positions.

The latch assembly 43 consists of a short spindle 44 mounted for partial rotation within bushings 45 secured to and depending below the lower surfaces 46 of the transverse members 16. The spindle 44 is retained within the bushings by means of a cotter pin 46A or the like through the outer end of the spindle as shown in FIG. 5.

A weight 47 is secured to the other end of the spindle and extends perpendicular therefrom and a dog 48 is secured to and extends outwardly from the spindle intermediate the bushings 45.

This latch assembly is secured to the transverse members 16 adjacent the pivotal connection between the inner and outer portions 22 and 23 of the members 21 as shown in FIGS. 3 and 4 and a support bracket 49 is secured to the side 50 of the transverse frame members 16 to support the weight 47 outboard of the members 16, in a position substantially parallel with the members 16, as clearly shown in FIGS. 3 and 4. The bracket is open at the upper side to enable the weight to be pivoted upwardly as will hereinafter be described An elongated aperture 51 (FIGS. 8-10) is formed through the wall of the underside 46 of the frame members 16 to allow the dog 48 to engage therethrough.

An aperture 52 is provided through the underside wall 53 of the inner portion 22 of the members 21 adjacent each end of this inner portion which is engaged by the extremity of the dog 48 as shown in FIG. 8.

When in the retracted position, the dog engages aperture 52 adjacent the pivot pin 26 and when in the extended position shown in FIG. 4, the dog engages the aperture 52 adjacent the innermost end 54 of the inner portion 22. An upper stop 49A extends from tube 16 immediately above support bracket 49 to prevent weight 47 and dog 48 from overrotating.

A tension spring 55 reacts against the innermost end 54 of the inner portion 22 and a stop 56 when the carrier assembly is in the retracted position shown in FIG. 3 and this spring prevents any rattling from occurring when the devices are retracted as shown.

The dog 48 prevents inadvertent extension of the rack assemblies due to the pressure of spring 55 engaging the dog 48 against the sides of the aperture 52 adjacent the pivotal junction between portions 22 and 23.

However when it is desired to extend the rack assemblies, a relatively sharp movement of the rack assemblies inwardly of the tubes 16 is initiated thus compressing spring 55 slightly and rotating the latch assembly to the position shown in FIG. 9 whereupon the distal end of the dog is disengaged from the aperture 52 and engages the underside wall 53 of the inner portion 22. This lifts the weight 47 upwardly from the bracket 49 at which time the springs 55 rapidly initiate the slight outward movement of the rack assemblies, said movement being fast enough to enable the aperture 52 to pass over the end of the dog 48 before the latching assembly can return to the position shown in FIG. 8 and prevent outward movement of the rack assembly.

Once the aperture adjacent the outer end 24 of the inner portion 22 has passed over the dog 48, the latch assembly is maintained in the position shown in FIGS. 9 and 10 and the rack assemblies can be extended until the pivot 26 between the portions 22 and 23 just clears the outer ends of the transverse members 16 thus enabling the outer portions 23 together with the racks to move downwardly to the position shown in FIG. 4 until checked by the snubbers 27.

In this position, the dog may engage the aperture 52 adjacent the inner end 54 of the portions 21 thus preventing further outward movement of the portions 21 which of course would cause disengagement of the entire rack assemblies from the support frames.

When retracting, the outer portions 23 together with the racks and load carrier thereby, is pivoted upwardly in the direction of arrow 57 until the portions 23 and 22 are in alignment whereupon inward pressure upon the rack assemblies will rotate the latching assembly to the position shown in FIG. 9 thus enabling the rack assembly to be retracted towards the position shown in FIG. 3. A soon as the aperture within portion 22 adjacent the pivotal connection 26 reaches the dog 48, the weight 47 will rotate the latching assembly to the position shown in FIG. 8 so that the dog 48 engages this aperture 52 and locks the assembly in the retracted position.

Although an extension ladder 41 is shown in phantom being carried by the rack assembly, nevertheless it will be appreciated that lengths of tubing or other material may be carried by the device depending upon the use for which the van or covered truck is required.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A roof rack assembly for vehicles such as vans or covered trucks which include a roof panel and side walls extending downwardly from the longitudinal edges of the roof panel, and comprising in combination a substantially rectangular support frame supportable upon the roof panel of a vehicle, means to detachably secure said frame upon the roof panel, a carrier on at least one side of said frame for receiving and supporting material thereon, and means cooperating between said carrier and said frame to move and support said carrier from a substantially horizontal retracted position upon said frame to an extended substantially vertical position adjacent the side wall of the associated vehicle and vice versa, said frame including a plurality of spaced and parallel, longitudinally extending frame members and at least two spaced and parallel tubular transverse members secured to and extending between said longitudinal frame members, said carrier including a pair of spaced apart, elongated members, including an inner portion, slideable telescopically within said transverse tubular members for retraction and extension of said carrier relative to said support frame as aforesaid and means for detachably holding said carrier in the said retracted and extended positions, said means detachably holding said carrier in the retracted and extended positions includes a latching assembly for each of said tubular transverse members of said frame, and operatively engaging between said tubular members and the corresponding elongated members of said carrier slideable therein, said latching assembly including a weighted dog pivoted to said tubular members and engaging through an aperture in the wall thereof, said dog being engageable with matching apertures one adjacent each end of the inner portion of said elongated members, when in the retracted and extended position respectively and compression spring means for normally urging said carrier outwardly when the said latching assembly is released.

2. The assembly according to claim 1 in which said means to support said frame upon said roof panel includes means extending from said frame detachably engaging the rain gutters of the associated vehicle and supporting said frame spaced above said roof panel.

3. The assembly according to claim 1 in which said carrier includes a material engaging rack extending between the outer ends of the spaced apart elongated members and means to retain said associated material within said rack.

4. The assembly according to claim 3 in which said rack includes an open, U-shaped jaw on the outer end of each of said elongated members and a U-shaped material receiving channel extending between said jaw.

5. The assembly according to claim 4 in which said means to retain said material includes a closure strap pivoted by one end thereof to one leg of said jaws and being detachably securably to the other leg of said jaws.

6. The assembly according to claim 1 in which said elongated members include an inner portion moveable slidably in and retained within said tubular members and an outer portion hingeably secured by the inner end thereof, to the outer end of each side of said inner portions, said portion being in substantially longitudinal alignment when retracted with both portions being situated within said tubular members and substantially at right angles to one another when in the extended position and snubber means at the pivotal junction of said portions for spacing said outer portion from contact with the sides of said associated vehicle.

7. The assembly according to claim 3 in which said elongated members include an inner portion moveable slidably in and retained within said tubular members and an outer portion hingeably secured by the inner end thereof, to the outer end of each of said inner portions, said portions being in substantially longitudinal alignment when retracted with both portions being situated within said tubular members and substantially at right angles to one another when in the extended position and snubber means at the pivotal junction of said portions for spacing said outer portion from contact with the sides of said associated vehicle.

8. The assembly according to claim 4 in which said elongated members include an inner portion moveable slidably in and retained within said tubular members and an outer portion hingeably secured by the inner end thereof, to the outer end of each of said inner portions, said portions being in substantially longitudinal alignment when retracted with both portions being situated within said tubular members and substantially at right angles to one another when in the extended position and snubber means at the pivotal junction of said portions for spacing said outer portion from contact with the sides of said associated vehicle.

9. The assembly according to claim 5 in which said elongated members include an inner portion moveable slidably in and retained within said tubular members and an outer portion hingeably secured by the inner end thereof, to the outer end of each of said inner portions, said portions being in substantially longitudinal alignment when retracted with both portions being situated within said tubular members and substantially at right angles to one anther when in the extended position and snubber means at the pivotal junction of said portions for spacing said outer portion from contact with the sides of said associated vehicle.

10. The assembly according to claim 1, which includes a carrier assembly upon each longitudinal side of said support frame.

11. The assembly according to claim 2 which includes a carrier assembly upon each longitudinal side of said support frame.

12. The assembly according to claim 3 which includes a carrier assembly upon each longitudinal side of said support frame.

13. The assembly according to claim 4 which includes a carrier assembly upon each longitudinal side of said support frame.

14. The assembly according to claim 2 in which said carrier includes a material engaging rack extending between outer ends of spaced apart elongated members and means to retain said associated material within said rack.

15. The assembly according to claim 14 in which said rack includes an open, U-shaped jaw on the outer end of each of said elongated members and a U-shaped material receiving channel extending between said jaw.

16. The assembly according to claim 15 in which said means to retain said material includes a closure strap pivoted by one end thereof to one leg of said jaws and being detachably securable to the other leg of said jaws.

17. The assembly according to claim 2 in which said elongated members include said inner portion moveable slidably in and retained within said tubular members and an outer portion hingeably secured by the inner end thereof, to the outer end of each of said inner portions, said inner and outer portions being in substantially longitudinal alignment when retracted with both portions being situated within said tubular members and substantially at right angles to one another when in the extended position and snubber means at the pivotal junction of said inner and outer portions for spacing said outer portion from contact with the sides of said associated vehicle.

18. The assembly according to claim 14 in which said elongated members include said inner portion moveable slidably in and retained within said tubular members and an outer portion hingeably secured by the inner end thereof, to the outer end of each of said inner portions, said inner and outer portions being in substantially longitudinal alignment when retracted with both portions being situated within said tubular members and substantially at right angles to one another when in the extended position and snubber means at the pivotal junction of said inner and outer portions for spacing said outer portion from contact with the sides of said associated vehicle.

19. The assembly according to claim 15 in which said elongated members include said inner portion moveable slidably in and retained within said tubular members and an outer portion hingeably secured by the inner end thereof, to the outer end of each of said inner portions, said inner and outer portions being in substantially longitudinal alignment when retracted with both portions being situated within said tubular members and substantially at right angles to one another when in the extended position and snubber means at the pivotal junction of said inner and outer portions for spacing said outer portion from contact with the sides of said associated vehicle.

20. The assembly according to claim 16 in which said elongated members include said inner portion moveable slidably in and retained within said tubular members and an outer portion hingeably secured by the inner end thereof, to the outer end of each of said inner portions, said inner and outer portions being in substantially longitudinal alignment when retracted with both portions being situated within said tubular members and substantially at right angles to one another when in the extended position and snubber means at the pivotal junction of said inner and outer portions for spacing said outer portion from contact with the sides of said associated vehicle.

* * * * *